F. O. LUECK.
BLOCK CLEANING MACHINE.
APPLICATION FILED SEPT. 13, 1912.
1,087,068.
Patented Feb. 10, 1914.
2 SHEETS—SHEET 1.
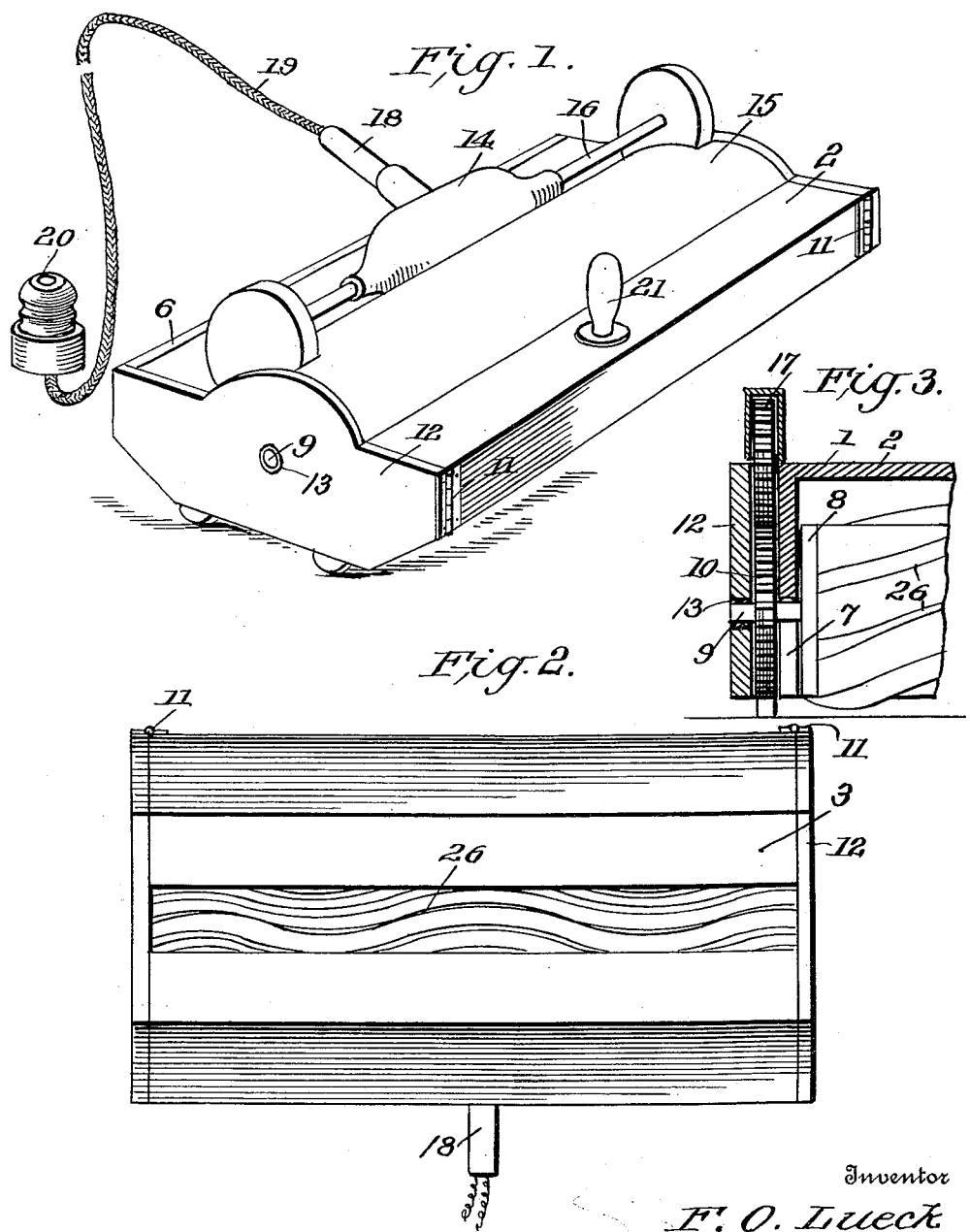
Inventor
F. O. Lueck

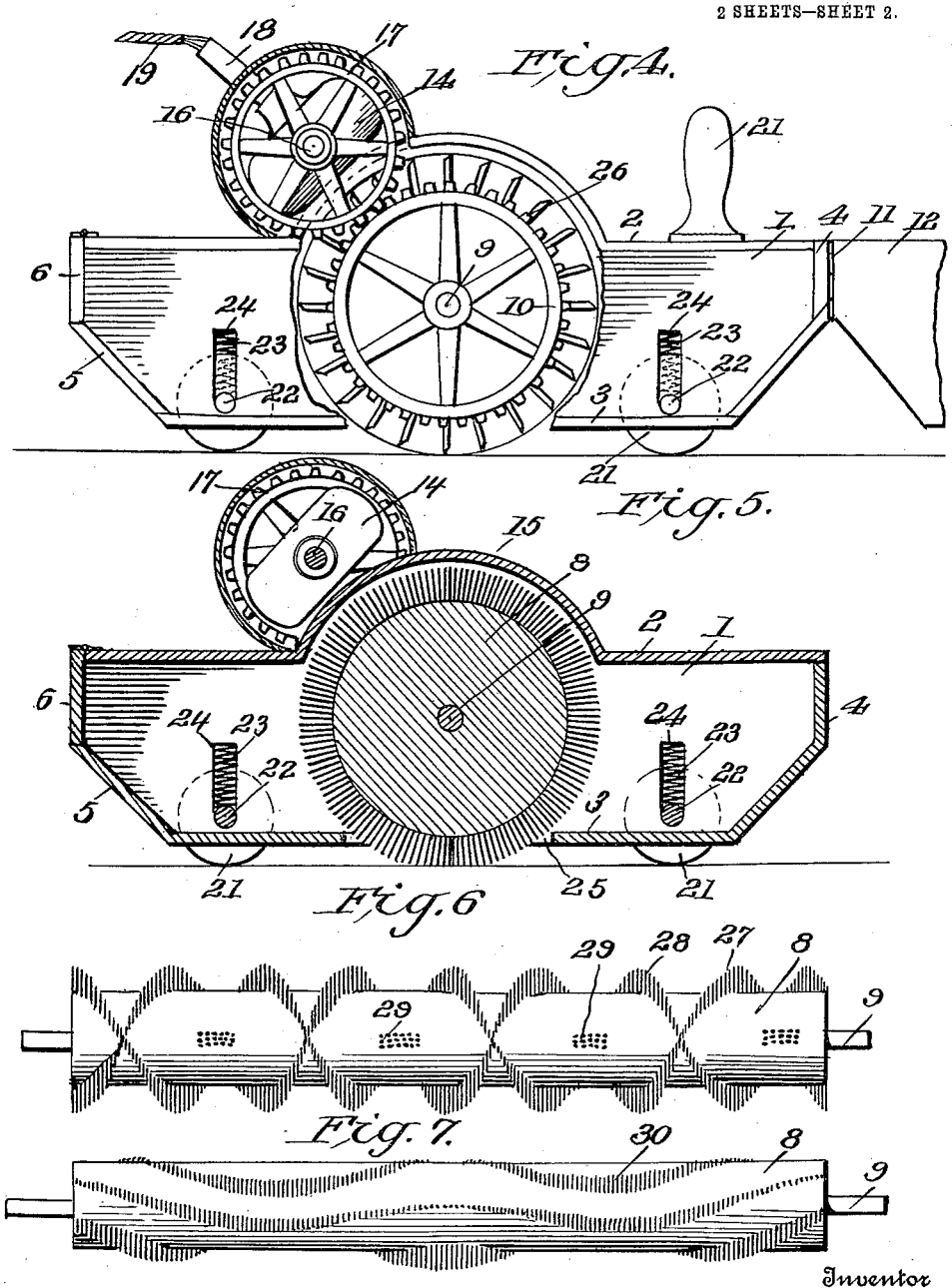

UNITED STATES PATENT OFFICE.

FRANK O. LUECK, OF TOMAH, WISCONSIN.

BLOCK-CLEANING MACHINE.

1,087,068. Specification of Letters Patent. Patented Feb. 10, 1914.

Application filed September 13, 1912. Serial No. 720,287.

*To all whom it may concern:*

Be it known that I, FRANK O. LUECK, a citizen of the United States, residing at Tomah, in the county of Monroe and State of Wisconsin, have invented certain new and useful Improvements in Block-Cleaning Machines, of which the following is a specification.

This invention has for its object to provide a highly efficient machine for cleaning meat blocks, chopping blocks, wooden meat counters, etc.

It is one aim of the invention to provide a motor driven machine for the purpose stated which may be readily and conveniently moved over the surface of the meat block or counter to be cleaned, and which will remove particles of meat and the like without scattering the same or permitting the same to fall to the floor.

It is a further aim of the invention to provide a meat block cleaning machine embodying in its structure a number of cleaning elements which may be readily interchanged so as to scrape or brush the block as may be desired.

Further the invention aims to provide a machine for the purpose stated so constructed and supported for movement over the block or the like to be cleaned that the scraping or brushing element of the machine may be caused to bear more or less firmly upon the block as desired or found to be necessary.

In the accompanying drawings Figure 1 is a perspective view of the machine embodying the present invention. Fig. 2 is a bottom plan view thereof. Fig. 3 is a vertical longitudinal sectional view through one end of the machine taken in a plane with the rotary block treating element of the machine. Fig. 4 is a view partly in side elevation and partly in section of the machine. Fig. 5 is a vertical sectional view taken from front to rear. Fig. 6 is a plan view of one of the brushes employed in the machine. Fig. 7 is a similar view illustrating a different type of brush.

In the drawings the machine is illustrated as including a casing, the sides of which are indicated by the numeral 1, the top by the numeral 2, the bottom by the numeral 3, and the front and rear sides respectively by the numerals 4 and 5, the rear side of the casing including a hinged door 6 which may be opened for the purpose of removing accumulated particles of meat and the like which have been taken up from the meat block by the scraping and brushing elements of the machine.

Each of the sides 1 of the casing is formed with a vertically extending slot 7 which opens at the lower edge of the said side and these slots are arranged to receive the ends of the journals of the rotary scraping and brushing elements as will be presently explained.

While various types of the rotary scraping and brushing elements are to be employed interchangeably in the machine, each of these elements consists essentially of a cylindrical body 8 provided at its ends with trunnions 9 each carrying a gear 10. Hinged to each of the sides 1 as at 11 is an auxiliary side 12 which is formed with an opening or provided with a bearing 13 designed to register or be brought into alinement with the upper end of the slot 7 in the respective side 1, when the auxiliary side is swung to the position shown in Fig. 1 of the drawings. The sides 1 are recessed or so constructed that when the auxiliary sides 12 are in closed position, they will be spaced from their respective sides 1, a housing being in this manner afforded for the gears 10, and other gears which are motor driven and which mesh with them.

It will now be understood that when the scraping and cleaning elements are to be assembled with the casing their trunnions 9 are inserted into the slots 7 so that they will engage in the upper ends of the said slots, the gears 10 being at such time located immediately outwardly of the respective sides 1 and between the said sides and the auxiliary sides 12, the extremities of the trunnions 9 engaging in the openings or bearings 13 in the auxiliary sides. It will thus be seen that while the scraping or brushing elements may be readily and quickly assembled with the casing and supported for rotation, they cannot become accidentally dismounted or otherwise displaced.

As a means for rotating the scraping and brushing elements there is provided an electric motor which is indicated by the numeral 14 and which is of any ordinary type, it being mounted upon the top 2 of the casing at an upwardly bulged portion 15 in the said top. The motor shaft is indicated at 16 and extends beyond opposite sides of the casing of the motor and at each end has fixed upon it a gear 17 which gears mesh with the gears 10 previously described. A handle 18 of insulating material is arranged upon the motor casing 14 and projects rearwardly therefrom and may be grasped for the purpose of moving the machine over the surface to be cleaned, and extending through this handle and into the motor casing is a conductor wire or cord 19 provided at one end with the ordinary plug 20 adapted to be fitted into a lamp socket. In order that the machine may be guided while moving it across the surface to be cleaned, a second handle 21 is provided upon the top 2 of the casing at the forward side thereof.

In order to support the machine for travel over a surface to be cleaned, there are provided two sets of supporting wheels 21, the wheels of each set being mounted for rotation at the ends of a shaft 22, and one of these shafts being located in advance and the other in the rear of the scraping or brushing element 8. The sides 1 of the casing are formed with vertically extending slots 23 within which are arranged springs 24 bearing at their upper ends at the upper walls of the slots, and at their lower ends against the respective shaft 22, the shafts 22 being fitted adjacent their ends for sliding movement in the said slots 23.

It will be observed from inspection of Figs. 4 and 5 of the drawings that the lower side of the scraping or cleaning member projects through an opening 25 which is formed in the bottom wall 3 of the casing, and that the casing is normally supported in such position that the scraping or brushing element will bear but lightly upon the surface to be cleaned. However, due to the provision of the springs 24 which bear downwardly upon the shafts 22, the casing is only yieldably supported and consequently pressure may be brought to bear thereon for the purpose of causing the scraping or brushing elements to bear more firmly upon the surface over which the machine is being moved.

That cleaning element which is illustrated in Figs. 2, 3 and 4 of the drawings has upon its cylindrical body 8 a number of blades 26, these blades extending lengthwise of the said body but along sinuous lines, although they may extend spirally about the body if desired. The cleaning element illustrated in Fig. 2 of the drawings is designed for use in brushing the block or counter after the element above described has been employed for the purpose of scraping the surface thereof, and in the said Fig. 6 the numerals 27 and 28 indicate spirally extending brushes or lines of bristles or tufts of bristles, the brush 27 extending in a direction opposite to the one indicated by the numeral 28. In this structure it is preferable to provide a number of tufts of bristles 29 upon the surface of the body 8 at a point substantially midway between the points of intersection of the said brushes.

In that form of cleaning element shown in Fig. 7 the cylindrical body 8 is provided upon its surface with a number of brushes or lines of bristles which extend lengthwise of the body along sinuous lines in the same manner as do the scraper knives 26, these lines of bristles being indicated by the numeral 29.

From the foregoing description of the invention it will be seen that there is provided a machine for the purpose stated which may be readily and conveniently manipulated; which is adapted for use in both scraping and brushing a meat block, meat counter or the like; and which is constructed and arranged to collect the particles of meat removed from the surface to be cleaned and retain the said particles, so that it will not be likely that they will fall to the floor or be scattered on the clean or scraped portion of the surface.

What I claim is:

1. In a machine of the class described, a casing having slots in its sides, a rotary cleaning member having journals removably fitted in the slots, auxiliary sides mounted upon the first mentioned sides and spaced therefrom and having each a bearing arranged to register with the upper end of the slot in the respective casing side and receive and retain the respective journal of the cleaning member, and means for rotating said cleaning member located between the main and auxiliary sides.

2. In a machine of the class described, a casing having slots in its sides, a rotary cleaning member having journals removably fitted in the slots, auxiliary sides mounted upon the first mentioned sides and spaced therefrom and having each a bearing arranged to register with the upper end of the slot in the respective casing side and receive and retain the respective journal of the cleaning member, and means for rotating said cleaning member, the said means including a motor arranged upon the casing, and gear connection between the motor shaft and one of the said journals, said gear connection lying between one of the sides of the casing and the corresponding auxiliary side.

In testimony whereof I affix my signature in presence of two witnesses.

FRANK O. LUECK. [L. S.]

Witnesses:
 ROBERT E. HOCHTRIT,
 FRED. W. GENRICH.